United States Patent
Hariharan et al.

(10) Patent No.: US 9,355,318 B2
(45) Date of Patent: May 31, 2016

(54) SYSTEM AND METHOD FOR CONTEXUALLY INTERPRETING IMAGE SEQUENCES

(71) Applicant: INTERNATIONAL BUSINESS MACHINES CORPORATION, Armonk, NY (US)

(72) Inventors: Rajaraman Hariharan, Sunnyvale, CA (US); Sri Ramanathan, Lutz, FL (US); Karthik Subbian, Bangalore (IN); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/522,078

(22) Filed: Oct. 23, 2014

(65) Prior Publication Data

US 2015/0043778 A1   Feb. 12, 2015

Related U.S. Application Data

(63) Continuation of application No. 13/170,911, filed on Jun. 28, 2011, now Pat. No. 8,904,517.

(51) Int. Cl.
| | |
|---|---|
| *G06K 9/00* | (2006.01) |
| *H04L 9/10* | (2006.01) |
| *G06F 12/00* | (2006.01) |
| *H04H 60/76* | (2008.01) |
| *G06F 9/45* | (2006.01) |
| *H04H 60/48* | (2008.01) |
| *H04L 12/24* | (2006.01) |

(Continued)

(52) U.S. Cl.
CPC .............. *G06K 9/00771* (2013.01); *G06F 8/43* (2013.01); *G06F 12/00* (2013.01); *G06K 9/00718* (2013.01); *H04H 60/48* (2013.01); *H04H 60/76* (2013.01); *H04L 9/10* (2013.01); *G06F 17/3087* (2013.01); *G06K 2009/00738* (2013.01); *H04H 20/65* (2013.01); *H04L 41/0618* (2013.01); *H04N 1/00204* (2013.01)

(58) Field of Classification Search
None
See application file for complete search history.

(56) References Cited

U.S. PATENT DOCUMENTS

| | | |
|---|---|---|
| 5,831,669 A | 11/1998 | Adrain |
| 5,867,817 A | 2/1999 | Catallo et al. |

(Continued)

OTHER PUBLICATIONS

Westec Intelligent Surveilance, "Westec Interactive Video Monitoring: When you need it, help is just seconds away", 1 page, URL: http://www.westec.net/monitoring.php, Downloaded on Apr. 21, 2011.

(Continued)

*Primary Examiner* — Hadi Akhavannik
(74) *Attorney, Agent, or Firm* — Matthew Chung; Roberts Mlotkowski Safran & Cole, P.C.

(57) ABSTRACT

A system and method for contextually interpreting image sequences are provided. The method comprises receiving video from one or more video sources, and generating one or more questions associated with one or more portions of the video based on at least one user-defined objective. The method further comprises sending the one or more portions of the video and the one or more questions to one or more assistants, receiving one or more answers to the one or more questions from the one or more assistants, and determining a contextual interpretation of the video based on the one or more answers and the video.

14 Claims, 4 Drawing Sheets

(51) Int. Cl.
  *H04N 1/00* (2006.01)
  *H04H 20/65* (2008.01)
  *G06F 17/30* (2006.01)

(56) References Cited

U.S. PATENT DOCUMENTS

| | | |
|---|---|---|
| 6,516,090 B1 | 2/2003 | Lennon et al. |
| 6,520,407 B1 | 2/2003 | Nieswand et al. |
| 7,167,583 B1 | 1/2007 | Lipson et al. |
| 7,200,266 B2 | 4/2007 | Ozer et al. |
| 7,460,149 B1 | 12/2008 | Donovan et al. |
| 7,872,668 B2 | 1/2011 | Mead et al. |
| 8,113,991 B2 | 2/2012 | Kutliroff |
| 8,151,343 B1 | 4/2012 | Wang et al. |
| 8,154,583 B2 | 4/2012 | Kurtz et al. |
| 8,312,376 B2 | 11/2012 | Barrett |
| 2003/0095681 A1 | 5/2003 | Burg et al. |
| 2003/0107649 A1 | 6/2003 | Flickner et al. |
| 2005/0014118 A1 | 1/2005 | Von Ahn |
| 2005/0025365 A1 | 2/2005 | Oosawa |
| 2006/0161218 A1 | 7/2006 | Danilov |
| 2006/0173859 A1 | 8/2006 | Kim et al. |
| 2006/0274145 A1 | 12/2006 | Reiner |
| 2007/0076799 A1 | 4/2007 | Wan |
| 2007/0136263 A1 | 6/2007 | Williams |
| 2007/0279490 A1 | 12/2007 | Zhou et al. |
| 2007/0296817 A1 | 12/2007 | Ebrahimi et al. |
| 2008/0012988 A1 | 1/2008 | Baharav et al. |
| 2008/0136908 A1 | 6/2008 | Carter |
| 2008/0144937 A1 | 6/2008 | Lim et al. |
| 2008/0147267 A1 | 6/2008 | Plante et al. |
| 2008/0172261 A1 | 7/2008 | Albertson et al. |
| 2008/0253628 A1 | 10/2008 | Matsue et al. |
| 2008/0269571 A1 | 10/2008 | Brown et al. |
| 2008/0297588 A1 | 12/2008 | Kurtz et al. |
| 2008/0304512 A1 | 12/2008 | Jung et al. |
| 2009/0074245 A1 | 3/2009 | Smilansky |
| 2009/0138723 A1 | 5/2009 | Nyang et al. |
| 2009/0248419 A1 | 10/2009 | Spaulding et al. |
| 2009/0313078 A1 | 12/2009 | Cross |
| 2009/0320077 A1 | 12/2009 | Gazdzinski |
| 2009/0327896 A1 | 12/2009 | Pall et al. |
| 2010/0017046 A1 | 1/2010 | Cheung et al. |
| 2010/0100950 A1 | 4/2010 | Roberts |
| 2010/0174558 A1 | 7/2010 | Smith et al. |
| 2010/0194753 A1 | 8/2010 | Robotham et al. |
| 2010/0198488 A1 | 8/2010 | Groitzsch et al. |
| 2010/0240945 A1 | 9/2010 | Bikko |
| 2010/0289641 A1 | 11/2010 | Kates |
| 2010/0325706 A1 | 12/2010 | Hachey |
| 2011/0035289 A1 | 2/2011 | King et al. |
| 2011/0107216 A1 | 5/2011 | Bi |
| 2011/0131528 A1 | 6/2011 | Nakamura |
| 2011/0153653 A1 | 6/2011 | King et al. |
| 2011/0153744 A1 | 6/2011 | Brown |
| 2011/0246174 A1 | 10/2011 | Johnson |
| 2011/0274259 A1 | 11/2011 | Eng et al. |
| 2011/0299747 A1 | 12/2011 | Solf et al. |
| 2011/0302532 A1 | 12/2011 | Missig |
| 2012/0016678 A1 | 1/2012 | Gruber et al. |
| 2012/0039452 A1 | 2/2012 | Horn et al. |
| 2012/0072420 A1 | 3/2012 | Moganti et al. |
| 2012/0131672 A1 | 5/2012 | O'Reirdan et al. |
| 2012/0158864 A1 | 6/2012 | Schindler et al. |
| 2012/0159586 A1 | 6/2012 | Carney et al. |
| 2012/0167204 A1 | 6/2012 | Akka |
| 2012/0191716 A1 | 7/2012 | Omoigui |
| 2012/0197857 A1 | 8/2012 | Huang et al. |
| 2012/0214442 A1 | 8/2012 | Crawford et al. |
| 2012/0278824 A1 | 11/2012 | Patil et al. |
| 2013/0268369 A1 | 10/2013 | McMaster et al. |

OTHER PUBLICATIONS

"MPI—Video Surveillance and Monitoring: Overview of System Architecture", pp. 1-3, URL: http://www.cs.cmu.edu/~vsam/FREcached/vision.ucsd.edu/Vsam/architecture, Downloaded on Apr. 21, 2011.
ADT, "ADT Video Surveillance Systems", pp. 1-3, URL: http://www.adt.com/medium_large_business/products_services/video_surveillance, Downloaded on Apr. 21, 2011.
Quinn et al., "CrowdFlow: Integrating Machine Learning with Mechanical Turk for Speed-Cost-Quality Flexibility", pp. 1-8.
Frokjaer et al., "Cooperative Usability Testing: Complementing Usability Tests with User-Supported Interpretation Sessions", 2005.
Kang et al., "Recognition-Based Gesture Spotting in Video Games", Pattern Recognition Letters, vol. 25, 2004, pp. 1701-1714.
Laxton et al., "Leveraging Temporal, Contextual and Ordering Constraints for Recognizing Complex Activities in Video", 2007.
Albright et al., "Contextual Influences on Visual Processing", Annu. Rev Neurosci, vol. 25, 2002, pp. 339-379.
Moore et al., "Recognizing Multitasked Activities From Video Using Stochastic Context-Free Grammar", 2002.

SYSTEM AND METHOD FOR CONTEXTUALLY INTERPRETING IMAGE SEQUENCES

TECHNICAL FIELD

The present invention generally relates to processing image sequences, and more particularly, to a system and method for contextually interpreting image sequences.

BACKGROUND

Most video observations are based on streams of video channels, which are surveyed by one or more employees of an organization, such as a police department. For example, employees of a police department may survey video to find a lost child in a county fair and/or a person of interest in a retail store. In another example, employees of a hospital may use video to monitor their patients.

Depending on its task, video observation requires different interpretations of recorded image sequences. For example, finding a lost child in a county fair may require only simple identification of the lost child in a recorded image, while finding a person of interest may require tracking and analyzing a person of interest on a video channel. More sophisticated observations may even require mathematical analysis of a stream of events and their results, which has led to the development of digital observation systems that help to process video streams more quickly.

However, current systems remain ineffective. For example, user-based systems may involve too few video streams, or those short in duration, which lead to valuable information being missed by user monitors. In other user-based systems, there are too many video streams, possibly running in parallel and spanning many hours, which may overwhelm user monitors and result in careless observations. While digital systems have helped increase video processing efficiency and accuracy, these digital systems also have significant limits, especially when advanced pattern recognition is required. For instance, while digital observation systems can adequately make simple identifications (e.g., of a speeding vehicle and its color and shape) and compute statistics (e.g., of a number of people moving in a monitored area), such digital observation systems may not perform some analysis as well as users (e.g., identify a person of interest through facial expressions).

SUMMARY

In a first aspect of the invention, a method includes receiving video from one or more video sources, and generating one or more questions associated with one or more portions of the video based on at least one user-defined objective. The method further comprises sending the one or more portions of the video and the one or more questions to one or more assistants, receiving one or more answers to the one or more questions from the one or more assistants, and determining a contextual interpretation of the video based on the one or more answers and the video.

In another aspect of the invention, a system is implemented in hardware which comprises a computer infrastructure operable to receive video from one or more video sources, and determine one or more questions associated with one or more Application Video Packets (AVPs) of the video that require user assistance based on at least one of user-defined criteria and predetermined criteria. The computer infrastructure is further operable to send the one or more AVPs and the one or more questions to one or more processor stations, collate one or more answers to the one or more questions from the one or more processor stations, and determine a contextual interpretation of the video based on the one or more answers, the predetermined criteria, and the video.

In an additional aspect of the invention, a computer program product comprises a computer usable storage medium having readable program code embodied in the storage medium. The computer program product comprises at least one component operable to receive video from one or more video sources. The at least one component is further operable to generate one or more questions associated with one or more portions of the video based on at least one user-defined objective, send the one or more portions of the video and the one or more questions to one or more assistants. The at least one component is also operable to receive one or more answers to the one or more questions from the one or more assistants, and determine a contextual interpretation of the video based on the one or more answers and the video.

In a further aspect of the invention, a method of contextually interpreting image sequences, comprises providing a computer infrastructure, which is operable to receive one or more Application Video Packets (AVPs) of video that requires user assistance and one or more questions associated with the one or more AVPs. The one or more questions are determined based on at least one of user-defined criteria and predetermined criteria. The computer infrastructure is further operable to determine one or more answers to the one or more questions based on the one or more AVPs, and send the one or more answers, to determine a contextual interpretation of the video based on the one or more answers, the predetermined criteria, and the video.

In another aspect of the invention, a computer system for contextually interpreting image sequences is provided. The system comprises a CPU, a computer readable memory and a computer readable storage media. First program instructions receive video from one or more video sources, second program instructions parse the video based on user-defined criteria, and third program instructions to determine whether the parsing of the video requires user assistance based on the user-defined criteria. Fourth program instructions determine one or more Application Video Packets (AVPs) of the video that requires user assistance and one or more questions associated with the one or more AVPs based on at least one of the user-defined criteria and predetermined criteria when the parsing of the video requires user assistance. Fifth program instructions send the one or more AVPs and the one or more questions to one or more processor stations. Sixth program instructions collate one or more answers to the one or more questions from the one or more processor stations, to determine a contextual interpretation of the video based on the one or more answers, the predetermined criteria, and the video. The first, second, third, fourth, fifth, and sixth program instructions are stored on the computer readable storage media for execution by the CPU via the computer readable memory.

BRIEF DESCRIPTION OF THE SERVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
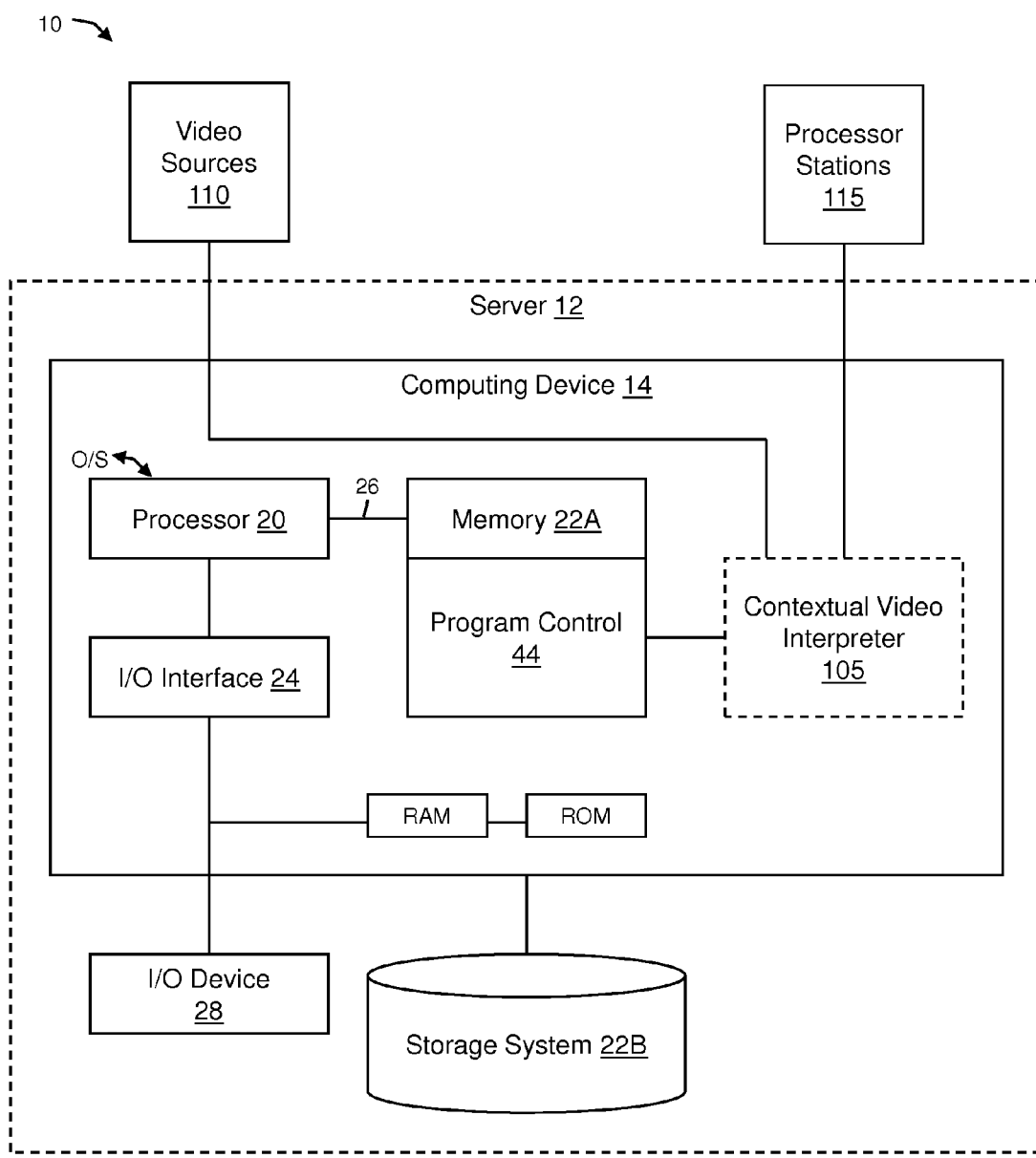
FIG. 1 shows an illustrative environment of a server and/or a computing device for implementing the steps in accordance with aspects of the invention.

The present invention generally relates to processing image sequences, and more particularly, to a system and method for contextually interpreting image sequences. More specifically, the present invention provides a user intelligence-supported image interpretation system used to supplement automated pattern recognition and image analysis. In embodiments, the image interpretation system can be, for example, a digital observation system using a process where one or more functions are performed by an assistant.

In embodiments, the present invention can include a contextual video interpreter which can receive and parse video, or one or more recorded image sequences, e.g., to identify a person of interest or other requested objective. If a user of the contextual video interpreter defines criteria or objectives requiring a more context-based interpretation of the video (e.g., to identify a person of interest at a store holding an item), the contextual video interpreter may determine whether the parsing of the video requires user assistance based on the user-defined criteria. If so, the contextual video interpreter may determine one or more portions of the video, or Application Video Packets (AVPs), which require assistance, and determine a set of questions for an assistant to answer based on the determined AVPs and the user-defined criteria. For example, to determine whether an individual in the store is holding an item, the contextual video interpreter may formulate a question, "Is an individual 'x' in the store holding a blender in his or her hand?"

In accordance with further aspects of the invention, the contextual video interpreter can send the AVPs and the associated questions to assistants for contextual interpretation of the AVPs. More specifically, the assistants may analyze the received AVPs and the associated questions received from the contextual video interpreter, and determine answers for the questions based on the AVPs. For example, in response to the question "Is an individual 'x' in the store holding a blender in his or her hand?", the assistants may determine a categorical answer, e.g., a "yes" or "no" answer. The contextual video interpreter may collate or assemble answers from different assistants, to process the collated answers and the AVPs for a consolidated (e.g., common consensus), contextual interpretation of the video. For example, the contextual video interpreter may determine that an individual "x" in the store is holding a blender in his or her hand, and is a potential person of interest.

Advantageously, the contextual video interpreter identifies a portion of video (e.g., an AVP) requiring a contextual interpretation (e.g., more than a simple identification of an object) to be analyzed by one or more persons (e.g., assistants). These aspects of the present invention use a computer's ability to quickly parse through video to present only the most pertinent video to one or more assistants, which leads to more accurate interpretations. In addition, the contextual video interpreter may determine questions for the assistants based on the AVP and defined criteria or objectives, and may collect and process answers to the questions. Thus, the present invention uses both interpretation abilities of a person and computer processing efficiencies, to accurately and quickly achieve a particular objective regarding video.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 comprises a server or other computing system 12 that can perform the processes described herein. In particular, the server 12 comprises a computing device 14. The computing device 14 can be resident on a network infrastructure or computing device of a third party service provider (any of which is generally represented in FIG. 1).

The computing device 14 also comprises a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device comprises random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard, etc.

In general, the processor 20 executes computer program code (e.g., program control 44), which can be stored in the memory 22A and/or storage system 22B. Moreover, in accordance with aspects of the invention, the program control 44 controls a contextual video interpreter 105, e.g., the processes described herein. The contextual video interpreter 105 can be implemented as one or more program code in the program control 44 stored in memory 22A as separate or combined modules. Additionally, the contextual video interpreter 105 may be implemented as separate dedicated processors or a single or several processors to provide the function of this tool. Moreover, it should be understood by those of ordinary skill in the art that the contextual video interpreter 105 is used as a general descriptive term for providing the features and/or functions of the present invention, and that the contextual video interpreter 105 may comprise many different components such as, for example, the components and/or infrastructure described and shown with reference to FIG. 2.

In embodiments, the contextual video interpreter 105 receives video, or one or more recorded image sequences, from one or more video sources 110. For example, the video sources 110 can include a video camera, a personal computer (PC), a smartphone, and/or other analog or digital video sources. The contextual video interpreter 105 parses or analyzes the received video based on criteria or objectives defined by a user of the contextual video interpreter 105, e.g., to identify a person of interest at a store. For example, the contextual video interpreter 105 may include the Smart Surveillance System (S3®) manufactured by International Business Machines (IBM®). The S3 is operable to parse video based on computer vision, pattern recognition and learning processes. (IBM and S3 are trademarks of International Business Machines Corporation registered in many jurisdictions worldwide.) The user may define the criteria to indicate to the S3 that the person of interest is wearing, e.g., a yellow shirt, and the S3 may then parse video of the store and recognize all individuals in the store wearing a yellow shirt. In another example, the user may define the criteria for the S3 to determine a rate of shoppers entering and/or leaving the store, and the S3 may then parse video of the store for, e.g., video of an entrance and/or exit of the store and people walking past the entrance and/or the exit.

In accordance with further aspects of the invention, the contextual video interpreter 105 can determine whether the parsing of the video requires assistance based on the criteria defined by the user. For example, the user may define the criteria to indicate to the contextual video interpreter 105 that the person of interest is wearing a yellow shirt and holding a blender in his or her hand. While the pattern recognition and learning processes of the contextual video interpreter 105 may recognize all individuals in a store wearing a yellow shirt, the contextual video interpreter 105 may determine that assistance is required to recognize an individual holding a blender, which is a more context-based analysis than color recognition. Of course, it should be understood by those of skill in the art that this is simply one of numerous examples, any of which should not be a limiting feature of the claimed invention. With respect to the more context-based analysis, a user may more efficiently and more accurately differentiate between a blender in an individual's hand and a blender in an individual's cart, and differentiate between a blender in an individual's hand and a blender in another individual's hand.

In embodiments, if the parsing of the video does require user assistance, the contextual video interpreter 105 can identify one or more portions of the video, or Application Video Packets (AVPs), which require assistance. The identifying may include separating certain portions from the remaining of the video based on, for example, the recognition that an individual may be holding something in his or her hand and/or that an item may be in a shopping cart, or other objective defined by a user, e.g., service provider, etc.

Based on the determined AVPs and the user-defined criteria, the contextual video interpreter 105 may determine a set of questions requiring assistance. For example, to determine whether an individual in the store is holding a blender in his or her hand, the contextual video interpreter 105 may determine a question, "Is an individual 'x' in the store holding a blender in his or her hand?" In another example, the contextual video interpreter 105 may determine a question, "Is a blender 'x' in a hand or a cart of an individual 'y'?" As noted above, other examples are also contemplated by the present invention.

In accordance with further aspects of the invention, the contextual video interpreter 105 can send the AVPs and the associated questions to one or more processor stations 115. In embodiments, the processor stations 115 may include a personal computer (PC), a laptop, a smartphone, a video analysis system, a digital observation system, and other processing systems operated by one or more users to analyze video. The contextual video interpreter 105 may send the AVPs and the associated questions to the processor stations 115 based on one or more constraints defined by the user of the contextual video interpreter 105. The constraints may include which processor stations 115 to send the questions associated with the AVPs. For example, the constraints may include geographical constraints, bandwidth constraints, security constraints, and/or user constraints (e.g., expertise of users assigned to certain processor stations), etc.

In embodiments, the users at the processor stations 115 can analyze the received AVPs and the associated questions received from the contextual video interpreter 105, and determine answers for the questions based on the AVPs. The questions may require the answers to be categorical (e.g., yes or no, "individual 'x' has a blender in his or her hand," "individual 'y' does not have a blender in his or her hand"), quantitative (e.g., numbers-based), and/or arbitrary in nature. Once the answers are determined, they may be sent to the contextual video interpreter 105, which may collate or assemble all of the answers from different processor stations (including the processor stations 115). The contextual video interpreter 105 may further process the collated answers and the AVPs for a consolidated (e.g., common consensus), contextual interpretation of the video, and/or may present (e.g., display) or send the interpretation to the user. For example, based on the collated answers and the AVPs, the contextual video interpreter 105 may determine that an individual "x" is wearing a yellow shirt, is holding a blender in his or her hand, and is a potential person of interest in the store.

Advantageously, the contextual video interpreter 105 allows a portion of video (e.g., an AVP) requiring a contextual interpretation (e.g., more than a simple identification of an object) to be analyzed by one or more users (e.g., a service provider). In addition, the contextual video interpreter 105 can quickly determine questions for the users based on the AVP and user-defined criteria or objectives, and can collect and process answers to the questions. Thus, the contextual video interpreter 105 uses both user interpretation abilities and computer processing efficiencies, to contextually analyze video and/or accurately achieve a particular objective regarding video.

While executing the computer program code, the processor 20 can read and/or write data to/from memory 22A, storage system 22B, and/or I/O interface 24. The program code executes the processes of the invention, for example, functions of the contextual video interpreter 105. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that comprises any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
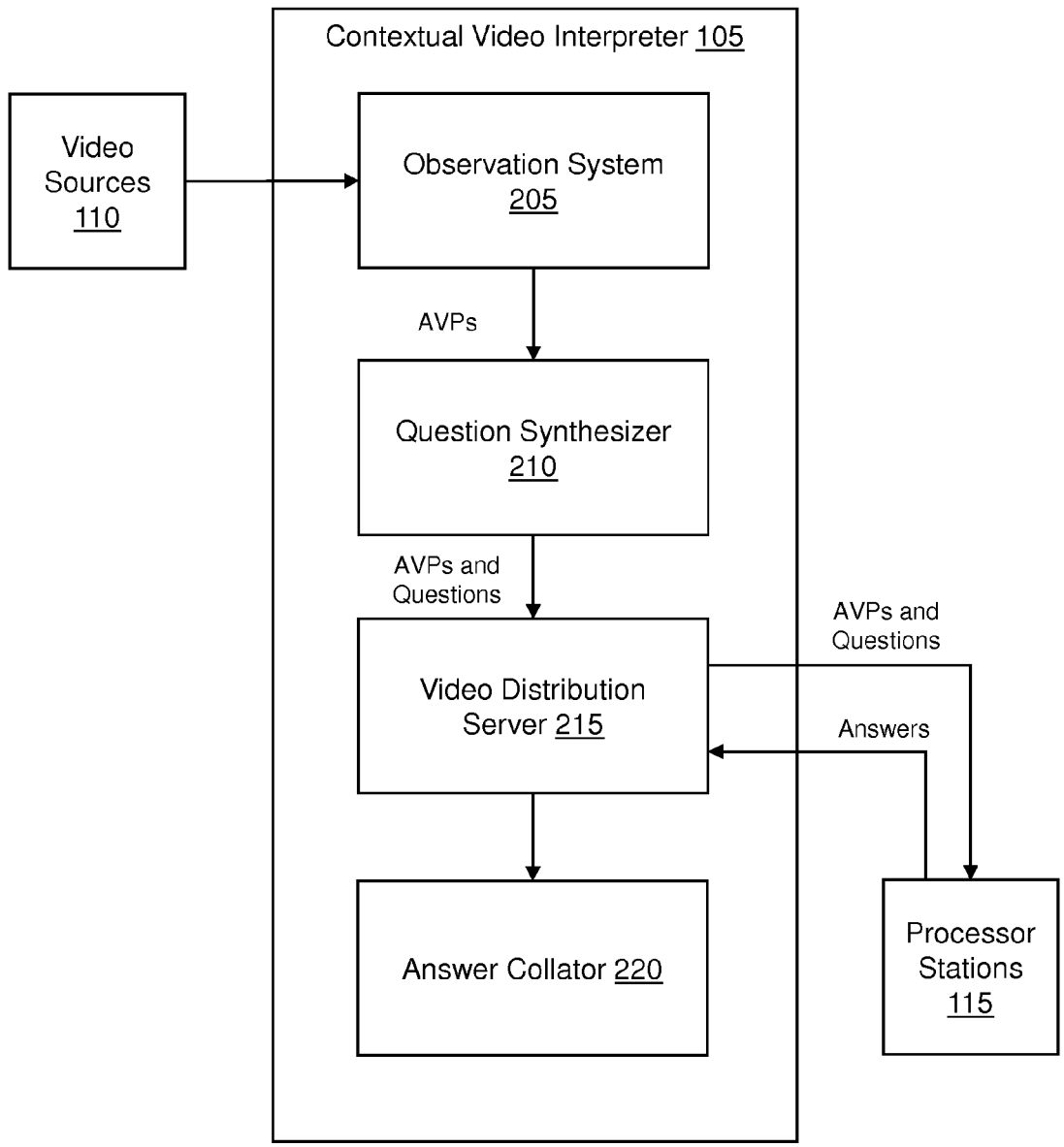
FIGS. 2-3 show other illustrative environments for implementing the steps in accordance with aspects of the invention.

FIG. 2 shows another illustrative environment 200 for implementing the steps in accordance with aspects of the invention. In embodiments, the environment 200 can include the one or more video sources 110, the contextual video interpreter 105, and the processor stations 115, in FIG. 1. The contextual video interpreter 105 may include an observation system 205, a question synthesizer 210, a video distribution server 215, and an answer collator 220.

In embodiments, the observation system 205 receives video, or one or more recorded image sequences, from the video sources 110. For example, the video sources 110 can include a video camera, a personal computer (PC), a smartphone, and/or other analog or digital video sources. The observation system 205 parses or analyzes the received video based on criteria or objectives defined by a user of the contextual video interpreter 105, e.g., to identify a hospital patient in distress. For example, the observation system 205 may be the Smart Surveillance System (S3®) operable to parse video based on computer vision, pattern recognition and learning processes. The user may define the criteria to indicate to the S3 that a patient in distress is someone who has difficulty breathing, and the S3 may then parse video of the hospital and recognize all individuals in the hospital in such condition by, e.g., large movements of their chests when they are at rest. In another example, the user may define the criteria for the S3 to determine a rate of shoppers entering and/or leaving a particular store, and the S3 may then parse video of the store for, e.g., people entering and/or leaving the store. The S3 may also flag patterns, such as a person dressed in a certain manner and/or leaving the store multiple times within a certain time period.

In accordance with further aspects of the invention, the observation system 205 can determine whether the parsing of the video requires user assistance based on the user-defined criteria. For example, the user may define the criteria to indicate to the observation system 205 that a person of interest is wearing a bright red dress and selecting many items in a store. While the pattern recognition and learning processes of the observation system 205 may recognize all individuals in a store wearing red, the observation system 205 may determine that user assistance is required to recognize a bright red dress and/or selecting many items, which require a more context-based analysis than color recognition. In embodiments, the determining of whether the parsing of the video requires user assistance may include determining whether the user-defined criteria requires user-required or context-related answers that are categorical (e.g., yes or no), quantitative (e.g., numbers-based), and/or arbitrary in nature. Such requirements for the answers may be set by the user in the criteria.

In another example, the user may define the criteria to indicate to the observation system 205 that a person of interest is wearing a red dress. The pattern recognition and learning processes of the observation system 205 may recognize a number of individuals wearing red and assign a confidence level (e.g., a percentage) of whether the observation system 205 recognized the person wearing the red dress based on the recognized number of individuals. For example, if the observation system 205 recognized eighteen individuals wearing red, then the assigned confidence level may be low in value, e.g., 25%. For example, if the observation system 205 recognized eighteen individuals wearing red and entering a building, but only seventeen individuals wearing red and exiting the building, then the assigned confidence level may be lower in value, e.g., 15%. If the observation system 205 recognized one or two individuals wearing red, then the assigned confidence level may be higher in value, e.g., 90%. The user (e.g., and/or a system manager or administrator) may further define the criteria to include a predetermined threshold value (e.g., 50%) for the assigned confidence level, such that if the assigned confidence level is less than the predetermined threshold value, then the parsing of the video requires user assistance.

In embodiments, if the parsing of the video requires user assistance, the observation system 205 can identify one or more portions of the video, or Application Video Packets (AVPs), which require such assistance based on the user-defined criteria. The identifying may include separating (e.g., cutting and/or copying) these portions from the rest of the video, and that may be relevant to the user-defined criteria (e.g., may include a person of interest selecting many items). Each of the AVPs may include from a single frame of the video up to many hours of the video, for example. The observation system 205 may send the AVPs to the question synthesizer 210. Based on the received AVPs and the user-defined criteria, the question synthesizer 210 may determine a set of questions for receiving and answering by one or more assistants. For example, to determine whether an individual in a hospital is in distress, the question synthesizer 210 may determine a question, "Is an individual 'x' in the hospital breathing heavily?" In another example, the question synthesizer 210 may determine a question, "Is an individual 'y' in the hospital reaching for an emergency assistance button?"

More specifically, the questions can ask the assistants to identify an image and/or an object (e.g., an individual in a yellow shirt) in the AVPs by pointing to or selecting the image and/or the object. In addition to the image and/or the object in the AVPs, the questions may ask the assistants to select an area of the image and/or a frame sequence of the AVPs, e.g., to help identify a person of interest in the AVPs. In embodiments, the questions may include any custom criteria (e.g., requests to select a shadow of an object, a type of object, etc.) defined by the question synthesizer 210 for the assistants to answer. The questions may include different levels of specificity, e.g., some of the questions may require a user with specific training to answer, while other questions may allow a random user with no specific training to answer. The question synthesizer 210 may append each of the questions to a particular AVP. Accordingly, the present invention may decide which user to provide which questions, based on the knowledge that certain users are at certain processing stations.

In accordance with further aspects of the invention, the question synthesizer 210 can send the AVPs and the associated questions to the video distribution server 215, which forwards the AVPs and the associated questions to the processor stations 115. In embodiments, the processor stations 115 may include a personal computer (PC), a laptop, a smartphone, a video analysis system, a digital observation system, and other processing systems that are operated by one or more users to analyze video. The processor stations 115 may also be geographically-distributed amongst one or more locations.

In embodiments, the video distribution server 215 can send the AVPs and the associated questions to the processor stations 115 based on one or more user-defined constraints. For example, the constraints may include geographical constraints, bandwidth constraints, and/or security constraints, e.g., specify that only processors at certain locations, with a certain amount of communication channels, and/or with a certain security clearance may be used. These constraints may ensure the maintenance of security of the AVPs and the observation video. In another example, the constraints may specify that the AVPs and the associated questions be sent to only authenticated processor stations. Accordingly, the video distribution server 215 may include an authentication and authorization mechanism (e.g., a user ID and password mechanism) to authenticate each of the processor stations 115 before sending them the AVPs and associated questions. Alternatively or additionally, the video distribution server 215 may include a user verification technique (e.g., a video Completely Automated Public Turing test to tell Computers and Humans Apart (CAPTCHA)) to verify that each of the processor stations 115 is operated by a user. The AVPs and the associated questions may also be used to verify that each of the processor stations 115 is operated by a user.

In accordance with further aspects of the invention, the video distribution server 215 may further send to each of the processor stations 115 the AVPs sequentially and in parallel with other processor stations. In addition, the video distribution server 215 may randomize (e.g., change an order of) the AVPs before sending them to the processor stations 115, such that any of the processor stations 115 receiving an AVP does not receive a next AVP in a same video sequence. This randomization of the AVPs further ensures the security of the AVPs and the observation video. Alternatively or additionally, the video distribution server 215 may send specific AVPs to specific processor stations 115 based on the user-defined criteria and/or predetermined criteria (set by a system manager or administrator). For example, each of the criteria may indicate that a specific AVP (e.g., involving a patient with difficulty breathing) requires a respiratory nurse to review and must be sent to a processor station operated by such an individual. Each of the criteria may also indicate that another specific AVP does not require a particular individual to review and can be randomized and sent to any of the processor stations 115.

In embodiments, the users at the processor stations 115 can analyze the received AVPs and the associated questions received from the video distribution server 215, and provide answers for the questions based on the AVPs. The questions may require the answers to be categorical, quantitative, and/or arbitrary in nature, and may require the users to collect more information before answering the questions. This latter feature may be performed by requesting additional video or sequence of videos over a certain time period, or associated with certain events, e.g., persons walking into and out of a store. The questions may require the users at the processor stations 115 to identify or select an image, an object, an image area, a frame sequence, and/or other features of the AVPs. Once the answers are determined, they may be sent to the video distribution server 215, which forwards the answers to the answer collator 220. The answer collator 220 may collate or assemble all or some of answers from different processor stations (including the processor stations 115) operated by different users (e.g., from an inexperienced nurse to a specialized nurse), and/or may ignore any of the answers in certain cases.

In accordance with further aspects of the invention, the answer collator 220 can send the collated answers and the AVPs to the observation system 205 and/or other observation systems for further processing. Alternatively or additionally, the answer collator 220 may itself process the collated answers and the AVPs for a consolidated (e.g., common consensus), contextual interpretation of the video, and/or may present (e.g., display) or send the interpretation to the user. For example, based on the collated answers and the AVPs, the answer collator 220 may determine that an individual "x" in hospital room "y" is in respiratory distress.

In embodiments, the contextual interpretation of the video may be dynamic (e.g., change based on prospective AVPs, questions, and answers) and/or static (e.g., not change based on the prospective AVPs, questions, and answers). In addition, the contextual interpretation of the video may be deferred for the prospective AVPs, questions, and answers. The contextual interpretation of the video may be used to increase or decrease a confidence level (e.g., a percentage) of whether the observation system 205 met the user-defined criteria or objective, e.g., properly recognized an individual in respiratory distress.

Figure 3:
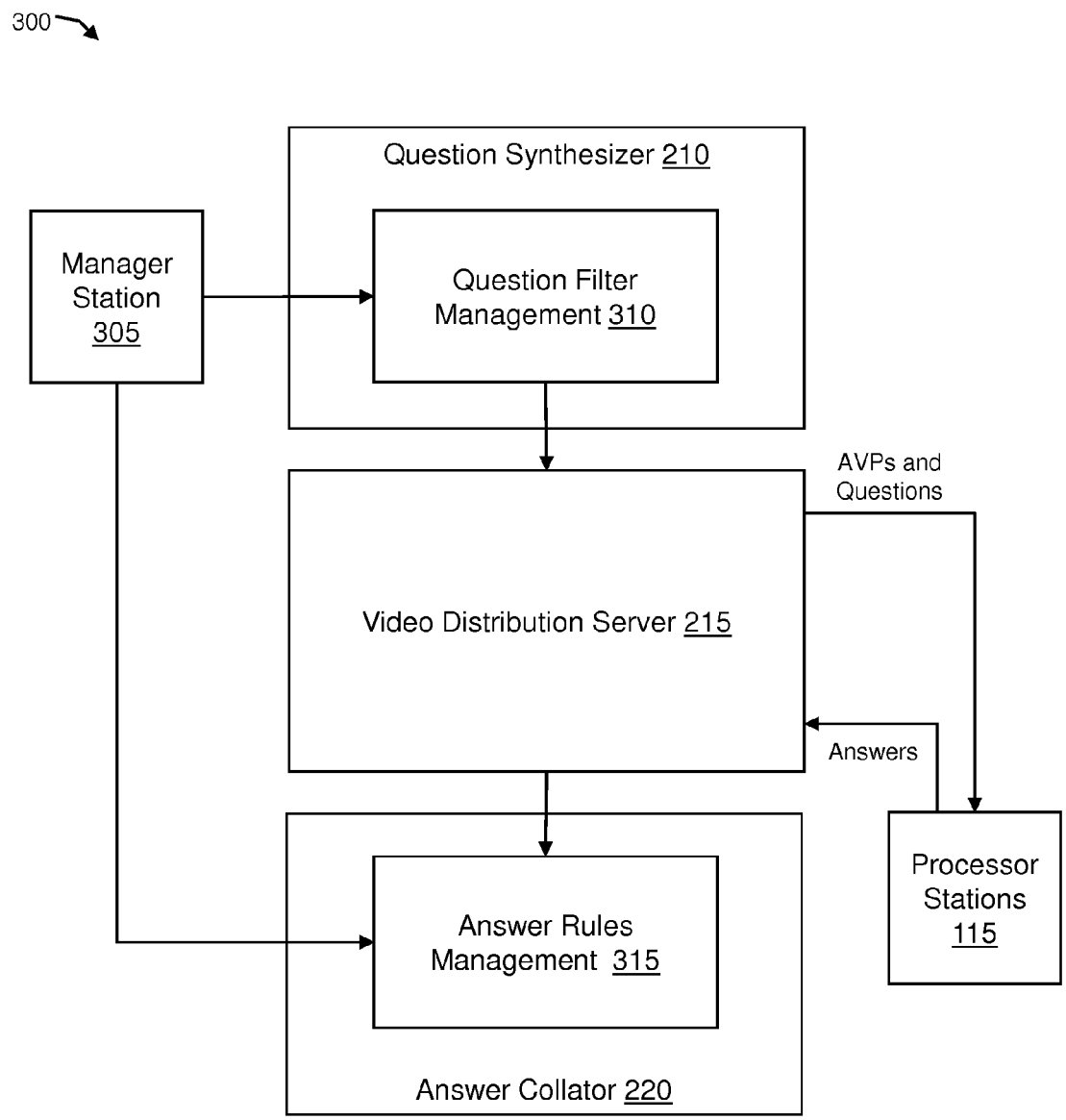

FIG. 3 shows another illustrative environment 300 for implementing the steps in accordance with aspects of the invention. In embodiments, the environment 300 can include the processor stations 115 in FIG. 1. The environment 300 may also include the question synthesizer 210, the video distribution server 215, and the answer collator 220, in FIG. 2. The environment 300 may further include a manager station 305. The question synthesizer 210 may include question filter management 310, and the answer collator 220 may include answer rules management 315.

In embodiments, the manager station 305 can be operated by a manager or administrator of a service provider to define criteria of the contextual interpretation system of the present invention. More specifically, the manager station 305 may define criteria for the question synthesizer 210 in the question filter management 310, and may define criteria for the answer collator 220 in the answer rules management 315. The manager station 305 may include a personal computer (PC), a laptop, a smartphone, a video analysis system, a digital observation system, and other processing systems that are operated by one or more users, e.g., the manager.

In accordance with further aspects of the invention, the criteria for the question synthesizer 210 can include one or more models which convert user-defined criteria or objectives received from an observation system (e.g., the observation system 205 in FIG. 2) into questions requiring answers that are categorical, quantitative, and/or arbitrary in nature. Thus, based on AVPs and the user-defined criteria that are received from the observation system, and the criteria in the question filter management 310, the question synthesizer 210 may determine a set of questions for user assistance to answer. For example, the user-defined criteria may instruct the contextual interpretation system to determine whether an individual is in distress in a certain hospital room. Based on the criteria in the question filter management 310, the question synthesizer 210 may translate the user-defined criteria into categorical questions, such as "Is an individual 'x' in room 'y' of hospital 'z' in distress?" In another example, based on the criteria in the question filter management 310, the question synthesizer 210 may translate the user-defined criteria into quantitative questions (e.g., "How many individuals in room 'y' appear to be in distress?") instead of or in addition to the categorical questions. The questions may include different levels of specificity and different types of user assistants to answer, e.g., some of the questions may require a user with specific training to answer, while other questions may allow a random user with no specific training to answer. Such levels of specificity and types of user assistants may also be defined by the manager station 305 in the question filter management 310.

In embodiments, the question synthesizer 210 can send the AVPs and the associated questions to the video distribution server 215, which forwards the AVPs and the associated questions to the processor stations 115. The users at the processor stations 115 may analyze the received AVPs and the associated questions received from the video distribution server 215, and determine answers for the questions based on the AVPs. The answers may be sent to the video distribution server 215, which forwards the answers to the answer collator 220.

In accordance with further aspects of the invention, the manager station 305 may define criteria for the answer collator 220 in the answer rules management 315. Such criteria for the answer collator 220 may include rules, e.g., on how to collate or assemble all of answers from different processor stations (including the processor stations 115) operated by different users. In embodiments, the rules may also include which observation systems (e.g., the observation system 205 in FIG. 2) to send the collated answers for further processing. The rules may further include instructions on how to process the collated answers for a consolidated, contextual interpretation of the video. For example, the instructions on processing the collated answers may indicate whether the contextual interpretation of the video is dynamic (e.g., change based on prospective AVPs, questions, and answers) and/or static (e.g., not change based on the prospective AVPs, questions, and answers). In addition, the instructions on processing the collated answers may indicate that the contextual interpretation of the video is to be used to increase or decrease a confidence level (e.g., a percentage) of whether the observation system met the user-defined criteria or objective. Once the contextual interpretation of the video is determined, the answer collator 220 may present (e.g., display) the contextual interpretation to the user of the system.

Figure 4:
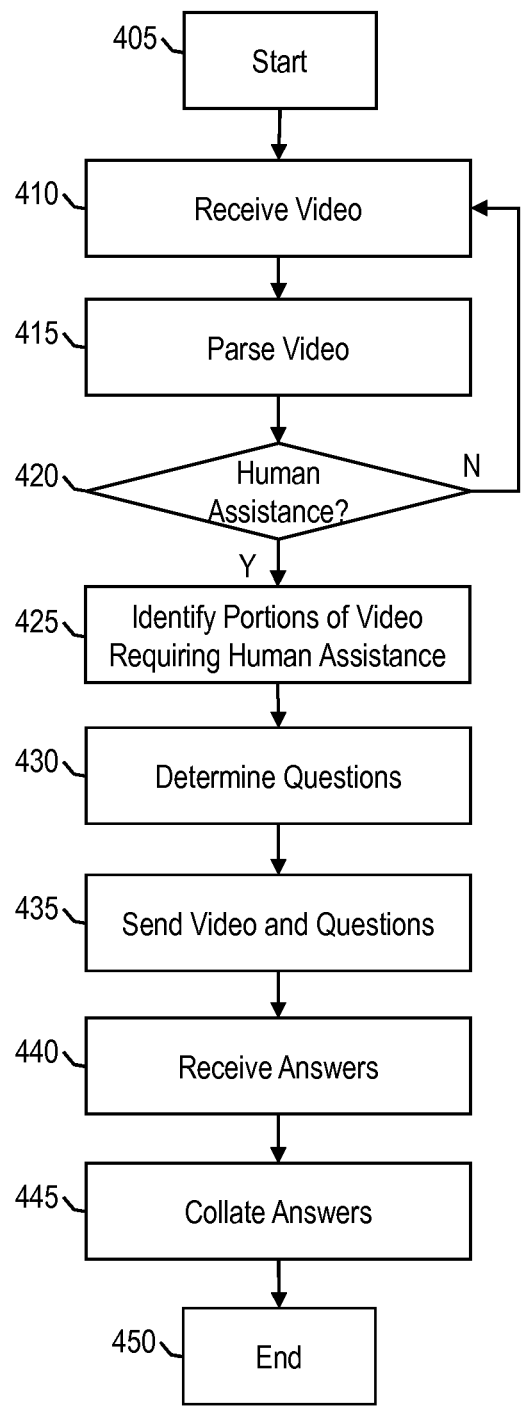
FIG. 4 shows an exemplary flow for contextually interpreting image sequences in accordance with aspects of the invention.

FIG. 4 shows an exemplary flow for performing aspects of the present invention. The steps of FIG. 4 may be implemented in the environment of FIGS. 1 and/or 2, for example. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1 and/or 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 4 depicts an exemplary flow for a process 400 of contextually interpreting image sequences in accordance with aspects of the present invention. In embodiments, the process 400 can be performed by the contextual video interpreter 105 in FIGS. 1 and/or 2. At step 405, the process starts.

At step 410, the contextual video interpreter receives video, or one or more recorded image sequences, from one or more video sources (e.g., the video sources 110 in FIG. 1). At step 415, the contextual video interpreter parses or analyzes the received video based on criteria or objectives defined by a user of the contextual video interpreter, e.g., to identify a person of interest at a store. At step 420, the contextual video interpreter determines whether the parsing of the video requires user assistance based on the user-defined criteria. For example, the user may define the criteria to indicate to the contextual video interpreter that the person of interest is wearing a certain clothing and holding a certain item. While pattern recognition and learning processes of the contextual video interpreter may recognize individuals wearing a certain color shirt, the contextual video interpreter may determine that user assistance is required to recognize an individual holding a certain item, which is a more context-based analysis than color recognition. If the parsing of the video does require user assistance, the process continues at step 425. Otherwise, the process returns to step 410.

At step 425, the contextual video interpreter identifies one or more portions of the video, or Application Video Packets (AVPs), which require user assistance for analyzing, based on the user-defined criteria. For example, the contextual video interpreter may separate (e.g., cut and/or copy) the portions of the video that may be relevant to meeting the user-defined criteria (e.g., that may include an individual in a store holding an item). At step 430, based on the determined AVPs, the user-defined criteria, and/or criteria defined by a manager or administrator of a service provider, the contextual video interpreter determines a set of questions for user assistance to answer. For example, to determine whether an individual in the store is holding an item of interest in his or her hand, the contextual video interpreter may determine a question, "Is an individual 'x' in the store holding item 'a' in his or her hand?" At step 435, the contextual video interpreter sends the AVPs and the associated questions to processor stations (e.g., the processor stations 115 in FIG. 1). In embodiments, the contextual video interpreter may send the AVPs and the associated questions to the processor stations based on one or more constraints defined by the user of the contextual video interpreter.

The constraints may include which users to send the AVPs and the associated questions. This may be based on certain skill sets of the users matching the criteria, the AVPs, and/or the associated questions. For example, an AVP and related questions regarding a patient in a hospital room under respiratory distress would be sent to a nurse specializing in such situations. The users being sent the AVPs and the associated questions may be determined by contextual video interpreter based on predetermined criteria set by a manager and/or administrator of the system (e.g., in the question filter management 310 in FIG. 3).

In embodiments, the users at the processor stations can analyze the received AVPs and the associated questions received from the contextual video interpreter, and determine answers for the questions based on the AVPs. At step 440, the contextual video interpreter receives the answers from the processor stations. At step 445, the contextual video interpreter collates or assembles all of the answers from different processor stations. The contextual video interpreter may further process the collated answers and the AVPs for a consolidated (e.g., common consensus), contextual interpretation of the video, and/or may present (e.g., display) or send the interpretation to the user. For example, based on the collated answers and the AVPs, the contextual video interpreter may determine that an individual "x" is having difficulty breathing and is in distress. At step 450, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method, comprising:
receiving, by a computer, video from one or more video sources;
generating, by the computer, one or more questions associated with one or more portions of the video;
sending, by the computer, the one or more portions of the video and the one or more questions to one or more assistants;
receiving, by the computer, one or more answers to the one or more questions from the one or more assistants; and
determining, by the computer, a contextual interpretation of the video based on the one or more answers and the video,
wherein: the video comprises recorded image sequences recorded by a surveillance system; the one or more assistants are one or more persons; and the determining the contextual interpretation by the computer uses interpretations of both the one or more persons and the computer;
further comprising identifying, by the computer, the one or more portions of the video for which the determining the contextual interpretation requires assistance based on at least one user-defined objective for the contextual interpretation;
wherein the at least one user-defined objective comprises identifying, based on one or more criterion defined by the user, one of: (i) one or more items possessed by a person in the video, and (ii) a person in the video having difficulty breathing.

2. The method of claim 1, wherein the at least one user-defined objective for the contextual interpretation comprises quantifying one or more objects in the video.

3. The method of claim 1, further comprising changing an order of the one or more portions of the video before the sending of the one or more portions of the video such that the one or more assistants receiving the one or more portions of the video do not receive consecutive portions of the video in a same video sequence.

4. The method of claim 1, further comprising sending the one or more portions of the video and the one or more questions to the one or more assistants which are specifically trained to answer the one or more questions based on the one or more portions of the video.

5. The method of claim 1, wherein a service provider at least one of creates, maintains, deploys and supports a computer infrastructure operable to perform the steps of claim 1.

6. The method of claim 1, wherein the steps of claim 1 are provided by a service provider on a subscription, advertising, and/or fee basis.

7. A system comprising:
a processor;
a computer readable hardware storage device; and
program instructions recorded on the computer readable hardware storage device for execution by the processor, the program instructions comprising:
program instructions to receive video from one or more video sources;
program instructions to determine whether one or more Application Video Packets (AVPs) of the video require user assistance for analyzing based on user-defined criteria;
program instructions to determine one or more questions associated with the one or more AVPs of the video that require user assistance based on at least one of the user-defined criteria and predetermined criteria;
program instructions to send the one or more AVPs and the one or more questions to one or more processor stations;
program instructions to collate one or more answers to the one or more questions from the one or more processor stations;
program instructions to determine a contextual interpretation of the video based on the one or more answers, the predetermined criteria, and the video; and
program instructions to identify one or more portions of the video for which the system requires assistance in the determining the contextual interpretation based on at least one user-defined objective for the contextual interpretation;
wherein the at least one user-defined objective comprises identifying, based on one or more criterion defined by the user, one of: (i) one or more items possessed by a person in the video; and (ii) a person having difficulty breathing in the video.

8. The system of claim 7, further comprising program instructions to parse the video based on the user-defined criteria.

9. The system of claim 8, further comprising:
program instructions to determine whether the parsing of the video requires user assistance based on the user-defined criteria; and
program instructions to determine the one or more AVPs based on the user-defined criteria when the parsing of the video requires user assistance.

10. The system of claim 8, further comprising program instructions to change an order of the one or more AVPs before the sending of the one or more AVPs such that the one or more processor stations receiving the one or more AVPs do not receive consecutive AVPs in a same video sequence.

11. The system of claim 7, further comprising program instructions to send the one or more AVPs and the one or more questions to the one or more processor stations which are operated by one or more users specifically-trained to answer the one or more questions based on the one or more AVPs.

12. The system of claim 7, wherein the at least one user-defined objective for the contextual interpretation comprises an answer that quantifies one or more objects in the video.

13. A computer program product comprising a computer readable hardware storage device having program instructions recorded on the computer readable hardware storage device, the program instructions comprising:
program instructions to receive video from one or more video sources;
program instructions to generate one or more questions associated with one or more Application Video Packets (AVPs) of the video based on at least one user-defined objective;
program instructions to send the one or more AVPs of the video and the one or more questions to one or more assistants;
program instructions to receive one or more answers to the one or more questions from the one or more assistants;
program instructions to determine a contextual interpretation of the video based on the one or more answers and the video; and
program instructions to identify one or more portions of the video for which the determining the contextual interpretation requires assistance based on at least one user-defined objective for the contextual interpretation.

14. The computer program product of claim 13, wherein the at least one user-defined objective comprises identifying, based on one or more criterion defined by the user, one of: (i) one or more items possessed by a person in the video; and (ii) a person in the video.

* * * * *